(12) United States Patent
Wang

(10) Patent No.: US 12,124,074 B1
(45) Date of Patent: Oct. 22, 2024

(54) LIGHT DIFFUSING PLATE

(71) Applicant: Tiejun Wang, Lin'an (CN)

(72) Inventor: Tiejun Wang, Lin'an (CN)

( * ) Notice: Subject to any disclaimer, the term of this patent is extended or adjusted under 35 U.S.C. 154(b) by 0 days.

(21) Appl. No.: 18/131,127

(22) Filed: Apr. 5, 2023

(51) Int. Cl.
*F21V 8/00* (2006.01)

(52) U.S. Cl.
CPC ............ *G02B 6/0065* (2013.01); *G02B 6/004* (2013.01)

(58) Field of Classification Search
CPC ................................ G02B 6/0065; G02B 6/004
See application file for complete search history.

(56) References Cited

U.S. PATENT DOCUMENTS

| | | | | |
|---|---|---|---|---|
| 2010/0085771 A1* | 4/2010 | Lin | ...................... | G02B 6/0043 |
| | | | | 362/606 |
| 2014/0347880 A1* | 11/2014 | Kuo | ...................... | G02B 6/0068 |
| | | | | 362/606 |
| 2021/0190293 A1* | 6/2021 | Diana | ...................... | F21S 8/086 |
| 2021/0191024 A1* | 6/2021 | Kajiya | ................... | G02B 5/045 |

FOREIGN PATENT DOCUMENTS

EP 2315060 A2 * 4/2011 ........... G02B 6/0036

* cited by examiner

*Primary Examiner* — Donald L Raleigh
(74) *Attorney, Agent, or Firm* — Daniel M. Cohn; Howard M. Cohn

(57) ABSTRACT

A light guiding plate (LGP) made of transparent material. The LGP has a side surface configured to enable light to enter the LGP. A top surface of the LGP has light-scattering imperfections and is configured to reflect light in the LGP downward. A bottom surface of the LGP is concave and configured to enable light in the LGP to leave the LGP.

9 Claims, 1 Drawing Sheet

LIGHT DIFFUSING PLATE

TECHNICAL FIELD

Embodiments of the technology relate generally to lighting systems and more specifically to lighting systems that can be readily configured by an injection molding process to produce illumination of different Gaussian dispersions.

BACKGROUND

For illumination applications, light emitting diodes (LEDs) offer substantial potential benefit associated with their energy efficiency, light quality, and compact size. However, to realize the full potential benefits offered by light emitting diodes, the ability to tailor and direct the light is very important.

One means of directing the light is with a device called a light guide which is used to direct light from a light source (commonly an LED) to a place where the light is needed. Light guides are also sometimes referred to as light pipes.

Light guides are usually made of glass or plastic, which typically have an index of refraction around 1.5. Light that is injected into the light guide within the correct range of angles becomes trapped inside the guide because of a phenomenon called total internal reflection, or TIR. Once trapped, the light remains inside the guide until it is extracted by an extraction feature, is fully absorbed by the material, or encounters a surface at less than the critical angle.

In some cases, the goal is to move the light from one end of the guide to the other. In other cases, the goal is to extract the light along the length of the light guide and send it in a specific direction. This makes the light guide appear lit. This extraction is achieved by adding components to the device like paint dots or textures (small bumps or holes) that influence the way the light is reflected, breaking the TIR condition and causing the light to exit the light guide.

Other types of light guides are used to homogenize light emerging from one or more light sources. By allowing light to travel down the length of a guide while reflecting off the sides, the light is "mixed," and the light emerging from the end of the light guide is spatially and angularly uniform.

Total internal reflection occurs when light that is inside a material such as glass or plastic encounters a boundary with a material with a lower index of refraction (typically air) at an angle greater than the critical angle. For certain shapes, such as rectangular plates or pipes, cylinders, or spheres, it is possible for light to become trapped inside the guide until it reaches the edges or end of the guide. This is what allows the light to be transported from the original light source down the guide to the other end with minimal losses.

SUMMARY OF THE INVENTION

In accordance with the present invention, a light guiding plate (LGP) made of transparent material comprises a side surface configured to enable light to enter the LGP; a top surface that is concave and has light-scattering imperfections and is configured to reflect light in the LGP downward; and a bottom surface that is concave and configured to enable light in the LGP to leave the LGP.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

Figure 1:
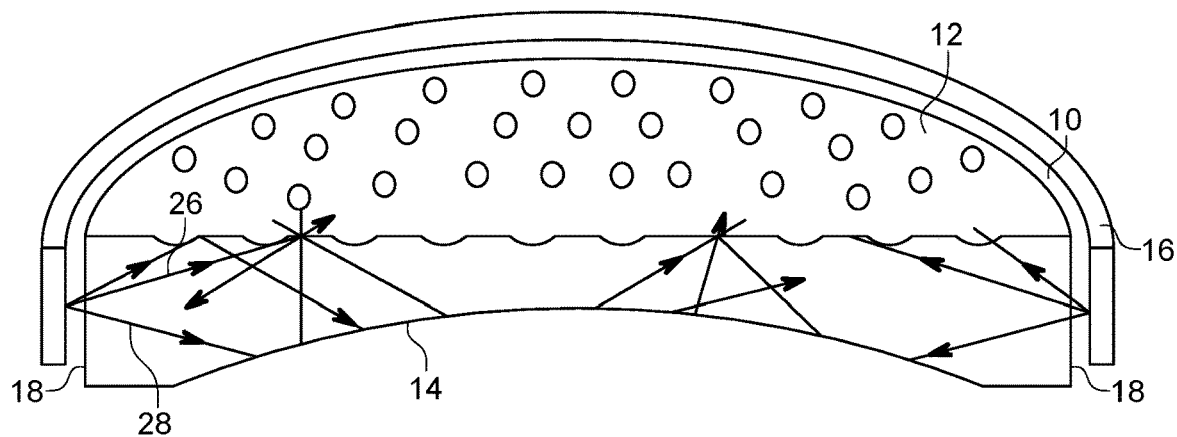

In some cases, similar elements may be referred to by similar numbers in various figures (FIGs) of the drawing, in which case typically the last two significant digits may be the same, the most significant digit being the number of the drawing figure (FIG). Furthermore, for clarity, some reference numbers may be omitted in certain drawings.

FIG. 1 is a three dimensional view of a light guiding plate (LGP), according to the present invention.

FIGS. 2-5 are four side sectional views of four respective light guiding plates (LGPs), in which each LGP is made of transparent material and has a side surface through which light enters the LGP, a top surface that reflects the light in the LGP downward, and a bottom surface through which light leaves the LGP, according to the present invention.

Figure 2:
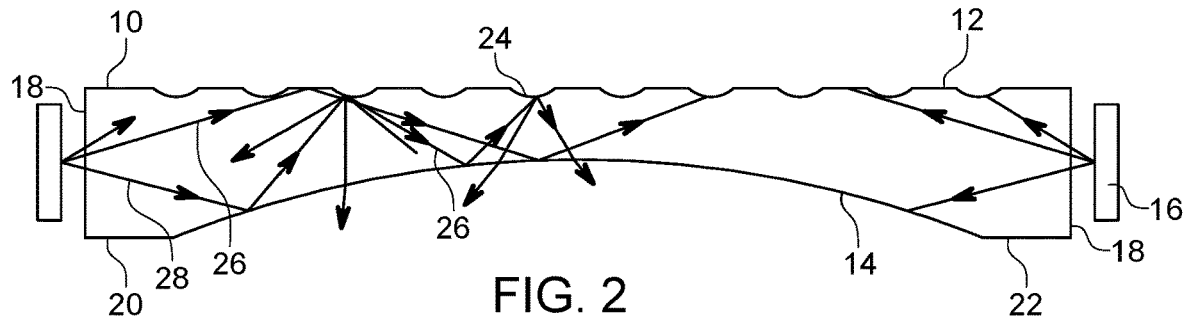

FIG. 2 shows a first LGP whose top surface is flat with light-scattering imperfections and whose bottom surface is concave and smooth, according to the present invention.

Figure 3:
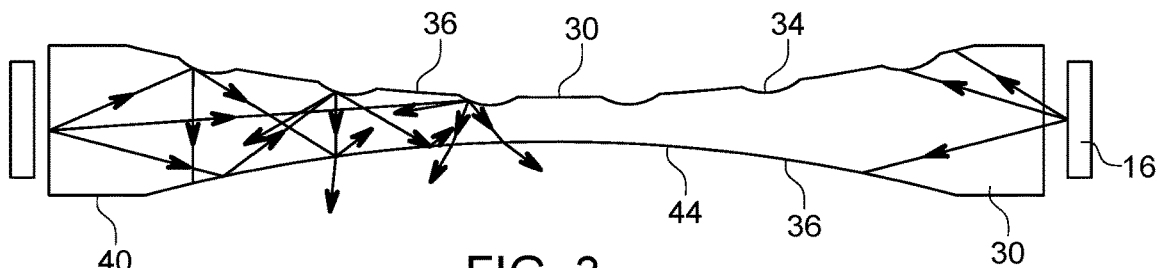

FIG. 3 shows a second LGP whose top surface is concave with light-scattering imperfections and whose bottom surface is concave and smooth, according to the present invention.

Figure 4:
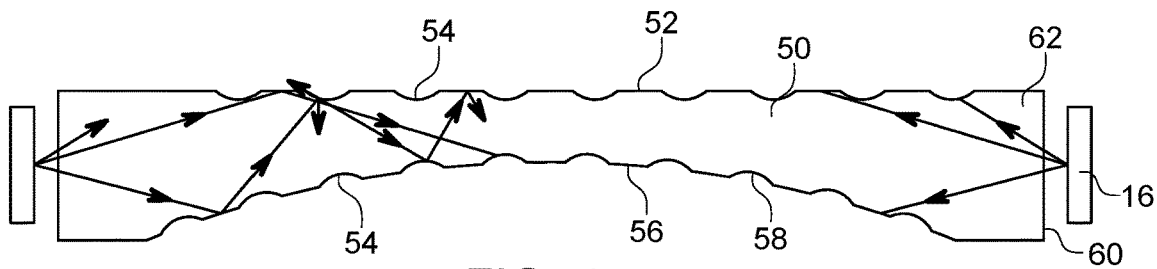

FIG. 4 shows a third LGP whose top surface is flat with light-scattering imperfections and whose bottom surface is concave with light-scattering imperfections, according to the present invention.

Figure 5:
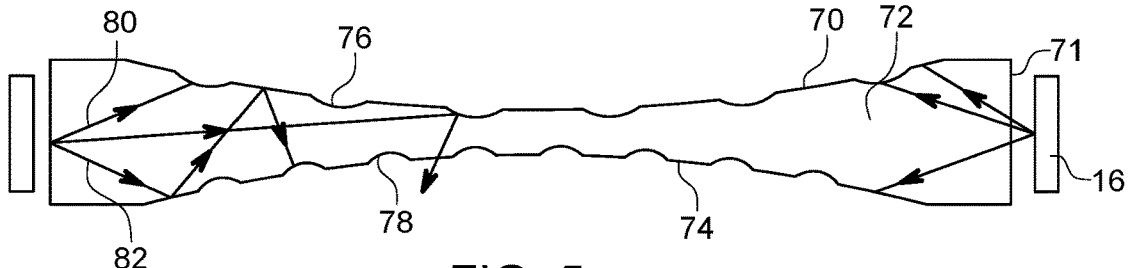

FIG. 5 shows a fourth LGP whose top and bottom surfaces are both concave with light-scattering imperfections, according to the present invention.

DETAILED DESCRIPTION OF THE PREFERRED EMBODIMENTS

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader and should not in any way be interpreted as limiting.

The light guiding plate 10, as shown in FIG. 1, has top surface 12 and a light emitting bottom surface 14 which has a curvature. The light guiding plate 10 is formed of a transparent plastic plate of PMMA or PS material that can be cut to achieve the desired shape.

The PMMA (Poly(methyl methacrylate) belongs to a group of materials called engineering plastics. It is a transparent thermoplastic. PMMA is also known as acrylic, acrylic glass, as well as by the trade names and brands Crylux, Plexiglas, Acrylite, Astariglas, Lucite, Perclax, and Perspex, among several others. This plastic is often used in sheet form as a lightweight or shatter-resistant alternative to glass.

The PS (Polystyrene) is a synthetic polymer made from monomers of the aromatic hydrocarbon styrene. Polystyrene can be solid or foamed. General-purpose polystyrene is clear, hard, and brittle. It is a poor barrier to oxygen and water vapor and has a relatively low melting point. Polystyrene can be naturally transparent, but can be colored with colorants.

As a thermoplastic polymer, polystyrene is in a solid (glassy) state at room temperature but flows if heated above about 100° C., its glass transition temperature. It becomes rigid again when cooled. This temperature behavior is exploited for extrusion (as in Styrofoam) and also for molding and vacuum forming, since it can be cast into molds with fine detail.

Referring to FIGS. 1 and 2, the first light guiding plate 10 has a top surface 12 that is generally formed through silk screen printing, laser dotting and hot pressing, so that the top surface 12 presents a flat or concave shape to achieve uniform illumination. The bottom light emitting surface 14 of the first light guiding plate 10 has is generally concave curvature with respect to the top surface 12 in several embodiments of the present invention.

Light can be projected from light sources, such as circular LEDs 16, into the sides 18 of the light guiding plate 10 from light sources 16 disposed around the perimeter of the light guiding plate 10. The light source 16 can be an LED which directs beams of light into the sidewall 18 of the light guiding plate 10.

The first light guiding plate (LGP) 10 of the present invention can be molded by an injection molding process. The bottom light emitting surface 14, as shown in FIGS. 1 and 2, is a smooth, curved surface having a flat edge wall section 20 and 22 at either end. The flat edge wall sections 20 and 22 are parallel to the flat top surface 12. The curved light emitting surface 14 can be provided with a frosted surface, a smooth surface or a serrated surface.

Referring again to FIGS. 1 and 2, the flat top surface 12 of the first light guiding plate 10 can be a formed with a flat surface, a frosted surface or a smooth surface. The flat top has surface 12 has light-scattering imperfections 24 and is configured to reflect light in the LGP downward, such as ray 26 in FIG. 2. The flat top surface 12 can be injected with spherical, cylindrical, and rhombic shapes so that the light which is reflected within the light guiding plate 10 meets the various shapes to create Gaussian dispersion of the light passing through the generally concave curvature of the curved light emitting surface 14.

Referring again to FIGS. 1 and 2, two rays of light 26 and 28 are shown passing through the sidewall 18 of the first light guiding plate 10. Light ray 26 reflects at an angle to the flat top surface 12 and then reflects down to the curved light emitting surface 14. Then, the ray 26 reflects up to the light-scattering imperfection 24. It the ray strikes the wall, with an angle that is less than the total reflection angle, it will pass through the sidewall and out of the light guiding plate 10.

Referring to FIG. 3, there is shown a second LGP 30 whose top surface 32 is concave with light-scattering imperfections 34 and whose bottom surface 36 is concave and smooth, according to the present invention.

The bottom surface 36 of the light emitting surface and the top surface 32 of the light guiding plate 30 have a concave curvature through the injection molding process, so that the wall thickness of the light guiding plate 30 is thinner than the thickness of the edge walls 40, saving materials. At the same time, the light guiding plate 30 can be directly molded by injection molding, without cutting and drying the mesh points, saving labor and time.

The light curved bottom light emitting surface 44 of the light guiding plate 10 can be a smooth surface, a microstructure surface or a double-sided dot surface, such as a textured surface and serrated surface, according to the uniformity requirements.

The dot size and density of the light guiding plate 10 can be adjusted according to the requirements of material, brightness and uniformity.

Referring to FIG. 4, there is illustrated a third LGP 50 whose top surface 52 is flat with light-scattering imperfections 54 and whose bottom surface 56 is concave with light-scattering imperfections 58, according to the present invention.

Light can be projected from circular LEDs 16 into the sides 60 of the light guiding plate 50 from light sources 16 disposed around the perimeter of the light guiding plate 50. The light source 58 can be an LED which directs beams of light into the sidewall 60 of the light guiding plate 50.

The light guiding plate 50 of the present invention can be molded by an injection molding process. The bottom light emitting surface 56, as shown in FIG. 4, is a concave curved surface with light-scattering imperfections 54 having a flat edge wall section 62 at either end. The flat edge wall sections 62 are parallel to the flat top surface 52 which also has light-scattering imperfections 54. The curved light emitting surface 56 having light-scattering imperfections 54 can be provided with a frosted surface, a smooth surface or a serrated surface.

Referring to FIG. 5, there is illustrated a fourth LGP 72 whose top surface 70 can be a formed with a concave, curved surface, a frosted surface or a smooth surface. Both the top surface 70 and the bottom light emitting surface 74 have light-scattering imperfections 76 and 78, respectively, and can be configured to reflect light in the LGP 72 downward and through the bottom light emitting surface 74. Both of the curved surfaces 70 and 74 can be injected with spherical, cylindrical, and rhombic shapes so that the light which is reflected within the light guiding plate 70 meets the various shapes to realize Gaussian dispersion of the light passing through the bottom surface.

It is to be understood that the above-described embodiments of the present invention are merely illustrative of or explaining the principles of the invention and are not to be construed as limiting the invention. Therefore, any modification, equivalent replacement, improvement and the like made without departing from the spirit and scope of the present invention should be included in the protection scope of the present invention. Further, it is intended that the appended claims cover all such variations and modifications as fall within the scope and boundaries of the appended claims or the equivalents of such scope and boundaries,

The invention claimed is:

1. A light guiding plate (LGP) made of transparent material and comprising:
   a side surface configured to enable rays of light to enter the LGP;

a flat top surface that has light-scattering imperfections and is configured to reflect the rays of light in the LGP downward towards the bottom light emitting surface; and the bottom light emitting surface being concave and configured to enable the rays of light in the LGP to leave the LGP from the bottom light emitting surface; and the bottom emitting surface having a flat edge wall sections at either end wherein the flat edge wall sections are parallel to the flat top surface.

2. The LGP of claim 1, wherein the top surface is flat and the bottom surface is smooth.

3. The LGP of claim 1, wherein the top surface is flat and the bottom surface is concave.

4. The LGP of claim 1, wherein the side surface faces a series of LEDs configured to emit light that enters the LGP through the side surface.

5. The LGP of claim 1, wherein the LGP is formed of a transparent plastic plate from a material selected from the group known as PMMA material and PS material.

6. The LGP of claim 5, wherein the LGP is formed of a transparent plastic plate from a PMMA material that is a transparent thermoplastic.

7. The LGP of claim 5, wherein the LGP is formed of PS (Polystyrene) a synthetic polymer made from monomers of the aromatic hydrocarbon styrene.

8. The LGP of claim 1, wherein when rays of light pass through the sidewall of the light guiding plate, light rays that reflect at an angle to the flat top surface and then reflect down to the curved light emitting surface, then, the light rays reflect up to the flat top surface having light-scattering imperfections.

9. The LGP of claim 1, wherein when rays of light strike the wall with an angle that is less than a total reflection angle, it will pass through the sidewall and out of the light guiding plate.

* * * * *